United States Patent [19]

Hanagami et al.

[11] Patent Number: 4,972,341
[45] Date of Patent: Nov. 20, 1990

[54] GRAPHIC PRINTER

[75] Inventors: Teruyasu Hanagami, Chiba; Michihiro Hino, Kanagawa; Takeshi Nakajima, Kanagawa; Shoichi Hori, Kanagawa, all of Japan

[73] Assignee: Sony Corporation, Tokyo, Japan

[21] Appl. No.: 196,729

[22] Filed: May 20, 1988

[30] Foreign Application Priority Data

May 21, 1987 [JP]  Japan ............................... 62-124707
May 22, 1987 [JP]  Japan ............................... 62-125491

[51] Int. Cl.⁵ ............................................. G06K 15/00
[52] U.S. Cl. ..................................... 364/519; 364/200
[58] Field of Search ........................... 364/518–520, 364/521, 235, 238.2, 238.3, 930, 940, 927.99; 346/154

[56] References Cited

U.S. PATENT DOCUMENTS 4,371,950  2/1983  Chadra .............................. 364/200
4,417,403  11/1983  Dinwiddie, Jr. ..................... 364/200
4,720,813  1/1988  Kaneko ............................. 364/900

Primary Examiner—Arthur G. Evans
Attorney, Agent, or Firm—Philip M. Shaw, Jr.

[57] ABSTRACT

A peripheral device for a computer is disclosed, which employs desired code setting means for determining a desired code and a comparator for comparing the thus determined code and a command from a host computer, whereby the control operation can be smoothly effected by the command from the host computer. Also, a graphic printer is provided as a peripheral device which employs a plurality of sampling clocks of which the phases are different from that of a reference sampling clock. These sampling clocks are selectively used to enable a video signal of a different phase from a computer to be printed out excellently.

7 Claims, 3 Drawing Sheets

GRAPHIC PRINTER

BACKGROUND OF THE INVENTION

1. Field of the Invention

The present invention relates to peripheral devices for a computer such as a graphic printer or the like of which the operation is controlled by a command signal from a computer.

2. Description of the Prior Art

When an image formed by a computer is printed out by a printer, if an image is formed on the basis of predetermined image forming data by, for example, a computer, such a data is transmitted to a printer and this printer provides an image equivalent to that of the computer and then prints the same. According to this conventional technique, data can be transmitted from the computer to the printer smoothly in a short period of time so that the image can be printed out while minimizing the influence upon other processings of the computer.

In this arrangement, however, the printer must be provided with an image forming program equivalent to that of the computer. Thus, the computer and the printer must correspond to in a one-to-one relation, losing a general-purpose characteristic of the printer.

Alternatively, it may be considered that data such as hue, brightness level and so on are formed at every picture element of an image formed by a computer and then the data are transmitted to a printer to print the image on the basis of the above-mentioned data. According to this method, however, it takes a lot of time for the computer to form the data to be transmitted. This hinders the other processings to be done by the computer and also this makes the printing time very long.

So far various apparatus have been proposed to print out a video signal derived from so-called video apparatus. Meanwhile, the computer supplies a video signal such as three primary color signals to a display apparatus for displaying, for example, an image.

In view of the above-mentioned aspect, the inventor of the present application has proposed the following technique for deriving and printing out a video signal supplied from the computer to the display apparatus or the like. This previously-proposed technique will be described with reference to FIG. 1.

Referring to FIG. 1, there are provided a computer 100 and a display apparatus 300, respectively. When a video signal generated in the computer 100 is displayed on the display apparatus 300, the video signal supplied to the display apparatus 300 is supplied through a video interface 6 to a graphic printer 200. Thus, this video signal is printed out on a printing paper 500. Input and output data or the like of desired control signals from the computer 100 are supplied through an existing interface 1 to the printer 200.

In this case, however, the video signal from the computer 100 is different from that of the general video apparatus in such a fashion that a signal to be formed is changed stepwise at every picture element. Thus, when such a video signal is printed out, a sampling phase at the printer must exactly coincide with the phase of the video signal from the computer. Should both the phases be displaced, there may be a risk that the printing would be displaced at each picture element or become impossible.

Meanwhile, in accordance with the standards of the general computers, the phase of the sampling clock is arranged to have a predetermined relationship relative to a horizontal synchronizing signal of, for example, the video signal. However, when a lot of compatible terminals are provided for the above-mentioned original computer, each of such compatible terminals is intended only to effect the display on, for example, the display apparatus so that the above-mentioned sampling phase is not always coincident with the computer. Accordingly, if the printer is designed so as to make the sampling phase comply with the standards of the original computer, when connected with the above-mentioned compatible terminal, the printer causes the picture elements of the printing to be displaced because of phase displacement and the printing becomes impossible.

Further, when the operation of peripheral devices such as a graphic printer or the like is controlled on the basis of a command from a host computer, a given code is generally set in the peripheral device side. Thus, when this code is instructed as a command data of the software from the host computer, the predetermined operation is effected.

In the above-mentioned apparatus, however, in order to replace a dot printer system with a color graphic printer or the like, if the code set in the color graphic printer coincides with that of the conventional dot printer, there will occur no problem. If they are different, the corresponding software or the like must be rewritten. Thus, when the above-mentioned system is modified, special knowledge for rewriting the software or the like is needed and the modification cannot be carried out without difficulty.

According to the above-mentioned conventional technique, when the video signal from the computer is printed, if the video signal having displaced phase is supplied thereto from the compatible terminals or the like, the picture elements for printing may be displaced or the printing becomes impossible. Also, when the system is modified, the software or the like must be rewritten so that the modification cannot be carried out without difficulty.

OBJECTS AND SUMMARY OF THE INVENTION

Accordingly, it is an object of the present invention to provide an improved peripheral apparatus such as a graphic printer.

It is another object of the present invention to provide a terminal such as a graphic printer for printing out a video signal generated from a computer in which the video signal is sampled and held by a predetermined sampling clock pulse and a plurality of sampling clock pulses each of which has a phase deviated relative to that of a reference sampling clock pulse by a desired amount, whereby the video signal can be latched by selecting the plurality of sampling clock pulses.

It is a further object of the present invention to provide a peripheral device such as a graphic printer of which the operation is controlled by a command from a host computer in which code setting means is provided to set a predetermined code and the command from the host computer and the code set by the code setting means are compared with each other to thereby control a video processor circuit and a head control circuit on the basis of the command.

According to one aspect of the present invention, there is provided a peripheral device for computer controlled by a command signal from a computer comprising:

(a) means for setting a predetermined code;

(b) comparing means for comparing said predetermined code set by said setting means and a command generated from said computer; and (c) control means for controlling the operation indicated by said command on the basis of an output signal from said comparing means.

According to other aspect of the present invention, there is provided a method for controlling a peripheral device for computer controlled by a command signal from a computer comprising the steps of:

(a) identifying whether or not a command from said computer arrives at;

(b) detecting the content of said command;

(c) detecting the content of a code determined by code setting means of said peripheral device; and (d) comparing said command and said code.

According to a further aspect of the present invention, there is provided a graphic printer for printing out a video signal from a host computer comprising:

(a) means for sampling said video signal by a predetermined sampling clock pulse and latching a sampled video signal;

(b) means for generating a plurality of sampling clock pulse having phases displaced from a phase of a reference sampling clock pulse; and selecting means for selecting from among the plurality of sampling clock pulses and supplying the selected sampling clock pulses to the means for sampling as the predetermined sampling clock pulse.

According to yet a further aspect of the present invention, there is provided a graphic printer for printing out a video signal from a computer comprising:

(a) a synchronizing separating circuit for separating a horizontal synchronizing signal of said video signal;

(b) a phase locked loop circuit supplied with said horizontal synchronizing signal from said synchronizing separating circuit;

(c) a gate array having a plurality of gate lines arranged such that phases of signals supplied thereto are arbitrarily displaced from a phase of a reference sampling clock pulse;

(d) a switch for selectively switching said plurality of gate lines; and (e) a sample and hold circuit for sampling said video signal on the basis of a signal derived from said switch.

The above, and other objects, features and advantages of the present invention will become apparent from the following detailed description of the preferred embodiments to be taken in conjunction with the accompanying drawings, throughout which like reference numerals designate like elements and parts.

DETAILED DESCRIPTION OF THE PREFERRED EMBODIMENTS

Now, the present invention will hereinafter be described in detail with reference to the drawings.

Figure 2:
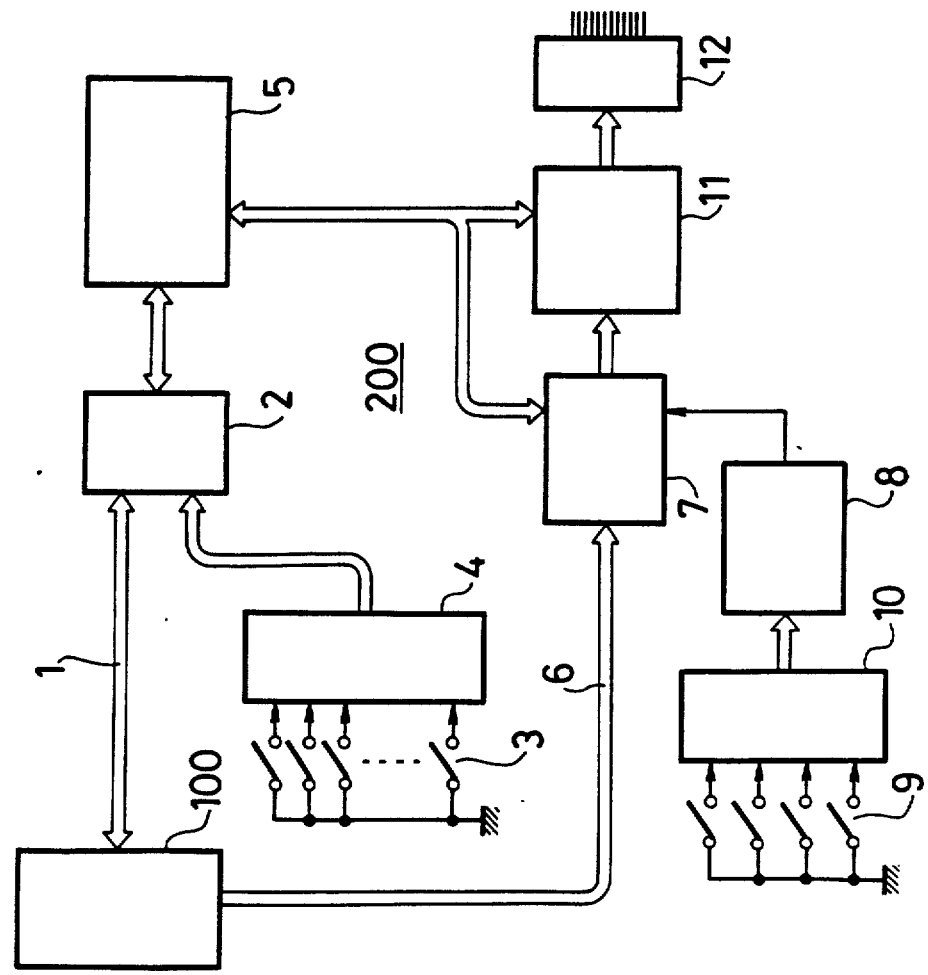
FIG. 2 is a block diagram of an embodiment of the present invention.

As FIG. 2 shows, in an embodiment of the present invention, there is provided a host computer 100 which supplies an operation control command through an interface 1, which is called a CENTRONICS interface or the like, to an I/O port 2 of a peripheral device such as a graphic printer 200 or the like. A signal from a first dip switch 3 to set a code or the like is supplied through a first encoder 4 to the I/O port 2. The signal from the I/O port 2 is supplied to a system control circuit 5 which is a central processing unit (CPU).

A video signal, which is supplied to, for example, a display apparatus (not shown), from the host computer 100 is supplied through a video interface 6 to a video processor circuit 7 which forms a graphic printer 200. The video processor circuit 7 receives a sampling clock derived from a sampling clock pulse generating circuit 8. Hereinafter the term "clock" or "clocks" will be understood to refer to clock pulse or pulses, respectively. A signal from a second dip switch 9 is supplied through a second encoder 10 to the sampling clock generating circuit 8, thus controlling the phase of the sampling clock.

This video processor circuit 7 is driven by a control signal from the system control circuit 5. The signal from the video processor circuit 7 is supplied through a head control circuit 11 to a printing head 12. The head control circuit 11 is similarly controlled on the basis of the signal from the system control circuit 5.

In the above-mentioned apparatus of the invention, the system control circuit 5 performs the processing which will be described below with reference to a flow chart forming FIG. 3.

Figure 3:
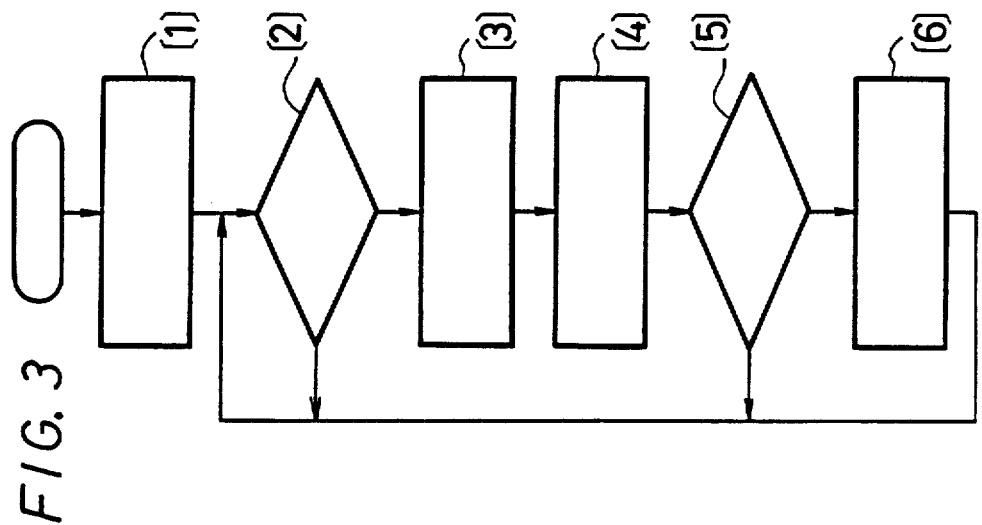
FIG. 3 is a flow chart to which references will be made in explaining the operation of the present invention.

Referring to FIG. 3, when the apparatus is activated or started in operation, the apparatus is initialized at step [1]. Then, it is decided at the next decisional step [2] whether or not the command signal from the host computer 100 arrives at. If the command signal is not yet supplied as represented by a NO at the decisional step [2], the step [2] is repeated. If on the other hand the command signal arrives at as represented by a YES at the decisional step [2], the command signal is detected at step [3]. The code set by the first dip switch 3 is detected at step [4], and the detected command signal and the detected code are compared at the next decisional step [5]. If they are not coincident as represented by a NO at the decisional step [5], the processing returns to step [2]. If on the other hand they are coincident as represented by a YES at decisional step [5], the processing goes to step [6]. At step [6], the operation control routine for the video processing circuit 7 and the head control circuit 11 is executed. After the routine is executed at step [6], the processing returns to step [2].

Accordingly, in this apparatus of the invention, when the operation control command for controlling the printer from the host computer 100 is [48H] (in hexadecimal notation), if the code by the first dip switch 3 is set as [48H], the graphic printer 200 can be operated by the command signal of [48H] from the host computer 100.

Thus, the routine set by the desired command signal can be effected without rewriting the existing software of the host computer 100.

In the above-mentioned apparatus, since the video signal supplied from the host computer 100 to the display apparatus (not shown) is processed and then the printing is carried out, the host computer 100 does not need special software for processing the video signal or the like. Further, an ending command signal from the system control circuit 5 is supplied through the interface 1 to the host computer 100 after the printing has been completed so that the host computer 100 can enter the next processing. Specifically, according to the above apparatus, for a system in which the dot printer, for example, is provided, when the dot printer is replaced with a new color graphic printer 200, if the code for the conventional dot printer is set in the dip switch 3, the graphic printer 200 can be directly operated by the operation control command from the host computer 100, controlling the operation of the graphic printer 200 smoothly.

According to the apparatus of the invention, as described hereinabove, since the desired code for controlling the operation is determined, this code and the command are compared to enable the operation to be smoothly controlled by the command signal from the host computer.

The above-mentioned arrangement is not limited to the graphic printer but can be similarly applied to other peripheral devices. Also, the dip switch may be realized by other hardware or may be other code setting means realized by the software.

Figure 1:
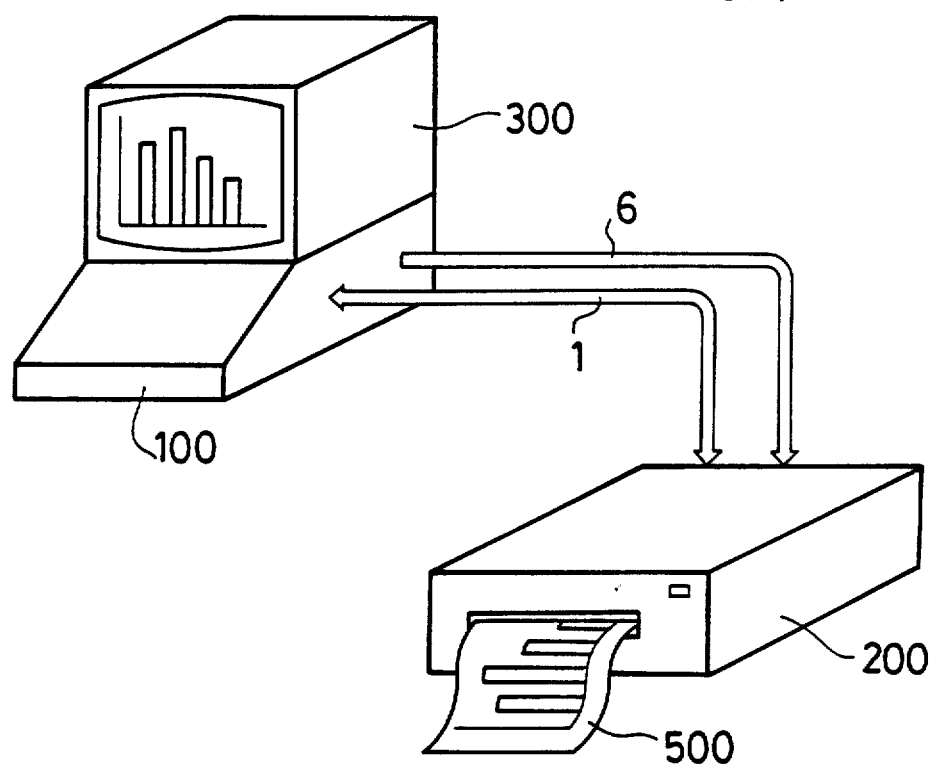
FIG. 1 is a schematic representation used to explain the conventional technique.
Figure 4:
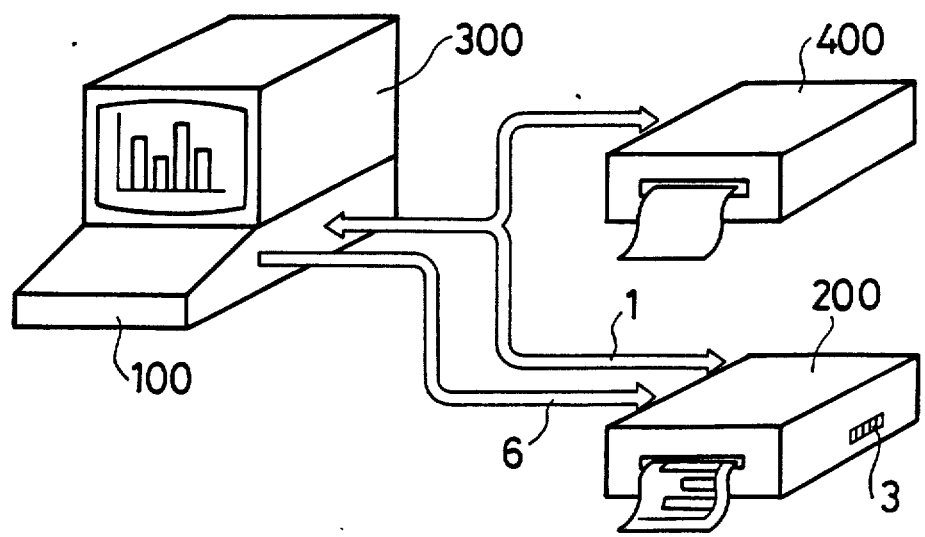
FIG. 4 is an illustration used to explain other embodiment of the present invention which is applied to other purpose.

In accordance with the above-mentioned apparatus of the present invention, as, for example, shown in FIG. 4, a plurality of peripheral devices (printers) are connected to the same interface in parallel and these peripheral devices can be controlled smoothly. To be more concrete, as FIG. 4 shows, there are provided a host computer 100 and a display apparatus 300. When an interface 1 and a video interface 6 from the host computer 100 are connected to a graphic printer 200, a dot printer 400, for example, is connected to this interface 1 in parallel to the graphic printer 200. Further, in this system, if the code of the dot printer 400 is set as [48H], the code of the dip switch 3 in the graphic printer 200 is selected to be other value than [48H], for example, [50H]. Then, according to the software provided in the host computer 100, by supplying the desired command signals of [48H] and [50H], it is possible to independently control these printers 200 and 400.

When the interface 1 is of a CENTRONICS type, if the control line at the printer side is designed as an open collector, these printers 200 and 400 can be smoothly controlled without interfering each other. Video data is supplied to the dot printer 400 through the interface 1.

Another embodiment of the selecting circuit which selects sampling clocks having different phases according to the present invention will be described next with reference to FIG. 5 and FIGS. 6A to 6E. As earlier noted, in the system shown in FIG. 2, the signal determined by the dip switch 9 is supplied through the encoder 10 to the sampling clock generating circuit 8 to thereby carry out the phase control operation. However, in the arrangement shown in FIG. 5, the phase control operation is effected on the basis of the synchronizing signal of the video signal from the host computer.

Figure 5:
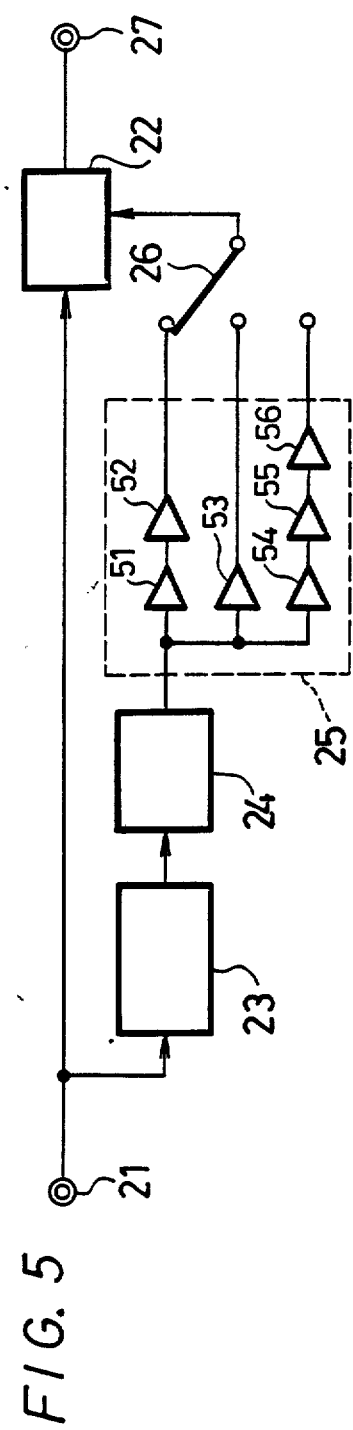
FIG. 5 is a block diagram showing a practical arrangement of the sampling clock selecting circuit according to the invention.

Referring to FIG. 5, an input terminal 21 is provided to receive the video signal from the computer (refer to FIG. 2). This input signal is supplied to a sample and hold circuit 22 and also to a synchronizing signal separator circuit 23 which separates the horizontal synchronizing signal. The thus separated horizontal synchronizing signal is supplied to a phase locked loop (PLL) circuit 24 which generates a signal having a frequency multiplied to the frequency of the sampling clock in the computer. This signal is supplied to a gate array 25 which is formed of gates 51, 52, 53, 54, 55 and 56. Thus, the gate array 25 produces a first sampling clock passed through the gates 51 and 52, a second sampling clock passed through the gate 53, and a third sampling clock passed through the gates 54, 55 and 56. One of the thus generated first to third sampling clocks is selected by a switch 26 and then fed to the sample and hold circuit 22. Then, the video signal sampled by the sample and hold circuit 22 is delivered to a output terminal 27 which is connected to a succeeding printing head (not shown) or the like.

Figure 6A:
FIGS. 6A to 6E are respectively timing charts used to explain the operation thereof.
Figure 6B:
Figure 6C:
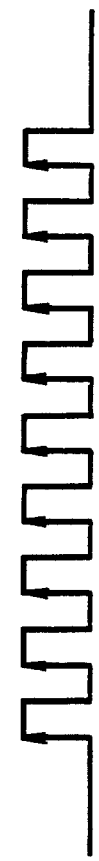
Figure 6D:

Accordingly, according to this selecting circuit, when a video signal of which the timing is shown, for example, in FIG. 6A is supplied to the input terminal 21, the horizontal synchronizing signal thereof is separated by the synchronizing signal separating circuit 23. The separated signal is processed by the phase locked loop circuit 24 so as to have a predetermined multiplied frequency. Each of the gates 51 to 56 in the gate array 25 forms a delay circuit having a predetermined delay time relative to the signal. Thus, the first sampling clock passed through the gates 51 and 52 is presented as shown in FIG. 6B; the second sampling clock passed only through the gate 53 is presented as shown in FIG. 6C; and the third sampling clock passed through the gates 54 to 56 is presented as shown in FIG. 6D, respectively.

Figure 6E:
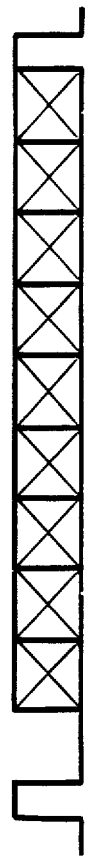

Therefore, the video signal shown in FIG. 6A can be sampled satisfactorily in the sample and hold circuit 22 by selecting the first sampling clock by the switch 26. Meanwhile, the video signal of which the phase is displaced as shown in FIG. 6E can be sampled satisfactorily in the sample and hold circuit 22 by selecting, for example, the third sampling clock by the switch 26.

Consequently, since the printing is effected by using the thus sampled signals, good printing can be effected to be free from the displaced picture elements of the printing and the disabled printing.

According to the above-mentioned apparatus of the present invention, since a plurality of sampling clocks having different phases are prepared and selectively used, a video signal having a different phase from the computer can be printed out satisfactorily.

In the above-mentioned apparatus of the invention, in principle, it is sufficient to provide as the sampling clocks two signals in which the phases thereof are different by 180°. In general, the delay time of the delay element such as the gate is not accurate and it is difficult to design a circuit or the like so as to accurately determine the delay time. Therefore, in the above-mentioned apparatus of the present invention, more than three sampling clocks are provided and then selected, thus producing an optimum sampling clock.

According to the present invention, as set forth above, since the desired code for controlling the operation can be determined and this code and the command are compared, it is possible to smoothly carry out the control operation by the command signal from the host computer.

Further, since a plurality of sampling clocks having different phases are prepared and then selected for use, the video signal having different phase from the computer can be printed satisfactorily.

The above description is presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. A computer peripheral device controlled by a command signal from an external computer comprising:
    (a) switching means for setting a predetermined code;
    (b) comparing means for comparing the predetermined code set by the switching means and a command for driving the peripheral device generated from the computer;
    (c) control means for controlling the operation of the computer peripheral device indicated by the command on the basis of an output signal from the comparing means; and
    (d) wherein the control means controls the operation indicated by the command only when the command coincides with the code.

2. A computer peripheral device according to claim 1, in which the switching means is a dip switch.

3. A computer peripheral device according to claim 1, in which the comparing means is a system controller formed of a central processing unit.

4. A computer peripheral device according to claims 1, 2 or 3, in which the computer peripheral device is a graphic printer.

5. A computer peripheral device according to claim 4, in which the graphic printer includes a printing head and the control means controls the printing head of the graphic printer.

6. A computer peripheral device according to claim 4, further including a video processor circuit which processes a video signal inputted to the graphic printer and in which the control means controls the video processor circuit.

7. A method for controlling a computer peripheral device controlled by a command signal rom an external computer comprising the steps of:
    (a) identifying whether or not a command from the computer has been received;
    (b) detecting the content of the command;
    (c) detecting the content of a code determined by a code setting switch means of the peripheral device;
    (d) comparing the command and the code;
    (e) executing an operation control routine; and
    (f) wherein at the comparing step, if the command coincides with the code then the executing step is performed whereas if the command does not coincide with the code, the identifying step is performed.

* * * * *